(12) United States Patent
Kapoor et al.

(10) Patent No.: US 11,450,310 B2
(45) Date of Patent: Sep. 20, 2022

(54) SPOKEN LANGUAGE UNDERSTANDING

(71) Applicant: ADOBE INC., San Jose, CA (US)

(72) Inventors: Nikita Kapoor, Madhya Pradesh (IN); Jaya Dodeja, Jharkhand (IN); Nikaash Puri, New Delhi (IN)

(73) Assignee: ADOBE INC., San Jose, CA (US)

( * ) Notice: Subject to any disclaimer, the term of this patent is extended or adjusted under 35 U.S.C. 154(b) by 31 days.

(21) Appl. No.: 16/989,012

(22) Filed: Aug. 10, 2020

(65) Prior Publication Data

US 2022/0044671 A1 Feb. 10, 2022

(51) Int. Cl.
*G10L 15/06* (2013.01)
*G10L 19/04* (2013.01)
*G10L 15/02* (2006.01)
*G10L 15/18* (2013.01)
*G10L 15/16* (2006.01)
*G10L 25/51* (2013.01)

(52) U.S. Cl.
CPC ............ *G10L 15/063* (2013.01); *G10L 15/02* (2013.01); *G10L 15/16* (2013.01); *G10L 15/1815* (2013.01); *G10L 15/1822* (2013.01); *G10L 19/04* (2013.01); *G10L 25/51* (2013.01)

(58) Field of Classification Search
None
See application file for complete search history.

(56) References Cited

U.S. PATENT DOCUMENTS

| 10,706,840 | B2* | 7/2020 | Sak .......................... G06N 3/02 |
| 11,087,739 | B1* | 8/2021 | Rastrow ................ G06F 40/289 |
| 2015/0269933 | A1* | 9/2015 | Yu ............................ G10L 17/18 |
| | | | 704/232 |
| 2017/0372200 | A1* | 12/2017 | Chen ........................ G10L 15/22 |
| 2019/0333500 | A1* | 10/2019 | Kim ........................ G06F 40/30 |
| 2020/0035222 | A1* | 1/2020 | Sypniewski ......... G06K 9/6256 |
| 2021/0012769 | A1* | 1/2021 | Vasconcelos ............ G06K 9/72 |
| 2021/0312905 | A1* | 10/2021 | Zhao ....................... G10L 15/16 |

OTHER PUBLICATIONS

Chen, Yuan-Ping, Ryan Price, and Srinivas Bangalore. "Spoken language understanding without speech recognition." 2018 IEEE International Conference on Acoustics, Speech and Signal Processing (ICASSP). IEEE, 2018. (Year: 2018).*

1Renato De Mori, Spoken Dialogues with Computers, Academic Press, Inc., Orlando, FL, USA, 1997; Located at: https://dl.acm.org/doi/book/10.5555/522562.

(Continued)

*Primary Examiner* — Shaun Roberts
(74) *Attorney, Agent, or Firm* — F. Chau & Associates, LLC

(57) ABSTRACT

Systems and methods for spoken language understanding are described. Embodiments of the systems and methods receive audio data for a spoken language expression, encode the audio data using a multi-stage encoder comprising a basic encoder and a sequential encoder, wherein the basic encoder is trained to generate character features during a first training phase and the sequential encoder is trained to generate token features during a second training phase, and decode the token features to generate semantic information representing the spoken language expression.

20 Claims, 8 Drawing Sheets

(56) References Cited

OTHER PUBLICATIONS

2Serdyuk, et al., "Towards end-to-end spoken language understanding," CoRR, vol. abs/1802.08395, 2018, 5 pages.
3Caubrière, et al., "Curriculum-based transfer learning for an effective end-to-end spoken language understanding and domain portability," CoRR, vol. abs/1906.07601, 2019, 5 pages.
4Ghannay, et al., "End-to-end named entity and semantic concept extraction from speech," in IEEE SLT Workshop, Athens, Greece, Dec. 2018, 9 pages.
5Lugosch, et al., "Speech model pre-training for end-to-end spoken language understanding," CoRR, vol. abs/1904.03670, 2019, 5 pages.
6Berard, et al., "Listen and translate: A proof of concept for end-to-end speech-to-text translation," in NIPS Workshop on End-to-end Learning for Speech and Audio Processing, 2016, 5 pages.
7Weiss, et al., "Sequence-to-sequence models can directly translate foreign speech," arXiv preprint arXiv:1703.08581, 2017, 5 pages.
8Amodei, et al., "Deep speech 2: End-to-end speech recognition in engiish and mandarin," CoRR, vol. abs/1512.02595, 2015, 10 pages.
9Bonneau-Maynard, et al., "Semantic annotation of the french media dialog corpus," in ISCA Eurospeech, Lisboa, Portugal, 2005, 4 pages.
10Dinarelli, et al., "Concept segmentation and labeling for conversational speech," in Proceedings of Interspeech, 2009, 4 pages.
11Hahn, et al., "Comparing stochastic approaches to spoken language understanding in multiple languages," IEEE TASLP, vol. 99, 2010, 16 pages.
12Simonnet, et al., "ASR error management for improving spoken language understanding," CoRR, vol. abs/1705.09515, 2017. 5 pages.
13Sutskever, et al., "Sequence to sequence learning with neural networks," in Proceedings of NIPS, 2014, 9 pages.
14Vaswani, et al., "Attention is all you need,", 31st Conference on Neural Information Processing Systems (NIPS 2017), Long Beach, CA, USA. 2017, 11 pages.
15Dinarelli, et al., "Hybrid neural models for sequence modelling: The best of three worlds," CoRR, 2019, 16 pages.
16Graves, et al., "Connectionist temporal classification: Labelling unsegmented sequence data with recurrent neural networks," in Proceedings of ICML. 2006, pp. 369-376, ACM, 8 pages.
17Bengio, et al., "Scheduled sampling for sequence prediction with recurrent neural networks," CoRR, vol. abs/1506.03099, 2015, 9 pages.
18Bahdanau, et al., "Neural machine translation by jointly learning to align and translate," CoRR, vol. abs/1409.0473, 2014, 15 pages.
19Hochreiter, et al., "Long short-term memory," Neural Comput., vol. 9, No. 8, Nov. 1997, 9 pages.
20Joulin, et al., "Inferring algorithmic patterns with stack-augmented recurrent nets," CoRR, vol. abs/1503.01007, 2015, 9 pages.
21Weiss, et al., "On the practical computational power of finite precision mns for language recognition," CoRR, vol. abs/1805.04908, 2018, 9 pages.
22Srivastava, et al., "Dropout: A simple way to prevent neural networks from over filling," Journal of Machine Learning Research, vol. 15, 2014, 30 pages.
23Haghani, et al., "From audio to semantics: Approaches to end-to-end spoken language understanding," CoRR, vol. abs/1809.09190, 2018, 7 pages.
24Kingma, et al., "Adam: A method for stochastic optimization," in International Conference for Learning Representations, 2015, Published as a conference paper at the 3rd International Conference for Learning Representations, San Diego, 2015, 15 pages.

* cited by examiner

SPOKEN LANGUAGE UNDERSTANDING

BACKGROUND

The following relates generally to spoken language understanding, and more specifically to an artificial neural network for automated spoken language understanding.

Spoken language understanding refers to a computer system interpreting natural language expressions spoken by a human being. In some cases, spoken language understanding involves both modeling a language (i.e., vocabulary and syntax) and identifying the sounds that correspond to different words. In some examples, artificial neural networks (ANNs) are trained to perform spoken language understanding tasks such as domain, intent and slot detection.

However, an ANN trained for spoken language understanding may require a large training set to achieve a low error rate. Since labeling training data is time and resource intensive, there is a need in the art for systems and methods for performing spoken language understanding with a reduced training dataset.

SUMMARY

The present disclosure describes systems and methods for spoken language understanding. Embodiments of the disclosure utilize an end-to-end neural network architecture, where semantic information is produced directly without generating an intermediate transcription. In some embodiments, the neural network includes a 2-stage encoder and a decoder. The 2-stage encoder includes a basic model for identifying acoustic features and a sequential model for encoding both acoustic and language features.

A method, apparatus, and non-transitory computer readable medium for spoken language understanding are described. Embodiments of the method, apparatus, and non-transitory computer readable medium receive audio data for a spoken language expression, encode the audio data using a multi-stage encoder comprising a basic encoder and a sequential encoder, wherein the basic encoder is trained to generate character features during a first training phase and the sequential encoder is trained to generate token features during a second training phase, and decode the token features to generate semantic information representing the spoken language expression.

A method, apparatus, and non-transitory computer readable medium for spoken language understanding are described. Embodiments of the method, apparatus, and non-transitory computer readable medium train a basic encoder to generate character features based on a spoken language expression, train a sequential encoder to generate token features based on the spoken language expression, combine the basic encoder, the sequential encoder and a decoder in sequence to produce an end-to-end neural network for spoken language understanding, and train the end-to-end network to generate semantic information for the spoken language expression.

An apparatus and method for spoken language understanding are described. Embodiments of the apparatus and method include a basic encoder configured to generate character features based on audio data for a spoken language expression, wherein the basic encoder is trained in a first training phase, a sequential encoder configured to generate token features based on output of the basic encoder, wherein the sequential encoder is trained during a second training phase, and a decoder configured to generate semantic information for the spoken language expression based on an output of the sequential encoder, wherein the decoder is trained together with the basic encoder and the sequential encoder during a third training phase.

DETAILED DESCRIPTION

The present disclosure relates generally to spoken language understanding, and more specifically to a neural network for automated spoken language understanding that can be trained end-to-end in a data-efficient manner. Embodiments of the present disclosure include encoding audio data using a multi-stage encoder comprising a basic encoder and a sequential encoder, wherein the basic encoder is trained to generate character features during a first training phase and the sequential encoder is trained to generate token features during a second training phase.

Figure 2:
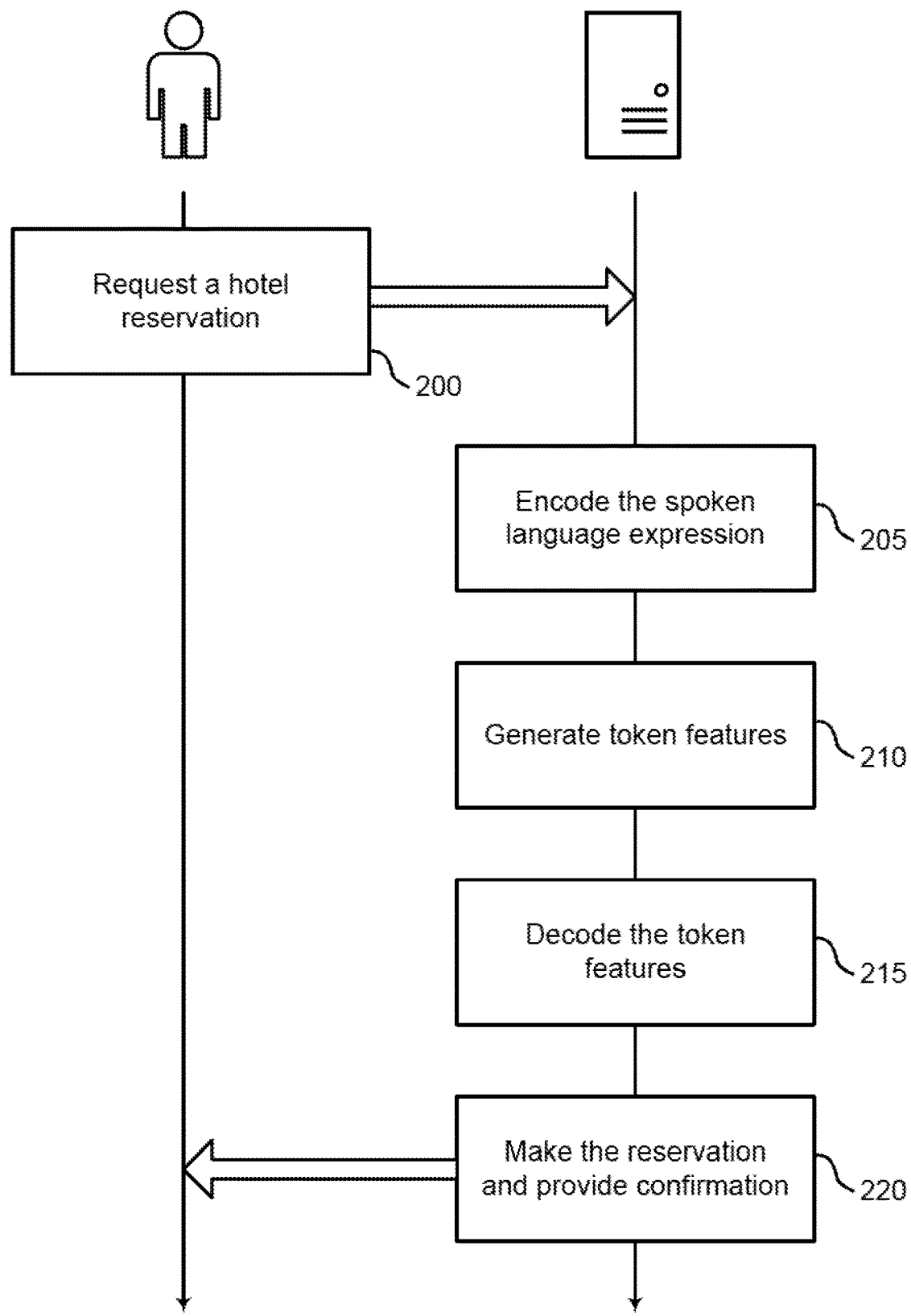
FIG. 2 shows an example of a process for SLU according to aspects of the present disclosure.

For example, a user may utter a spoken language expression to make a reservation for a hotel room (as illustrated in FIG. 2), or to order food at a restaurant. Embodiments of the present disclosure enable interpretation of the spoken language expression to efficiently book the correct room at the desired time, or to trigger preparation of the correct meal. Using the multi-stage encoder described herein, embodiments of the disclosure can perform such tasks more efficiently with a reduced amount of training data.

Spoken language understanding (SLU) techniques extract a semantic representation from a speech signal in a variety of human-computer interaction applications. For example, SLU systems can be used for domain, intent and slot detection. SLU systems can be categorized as either pipeline systems or end-to-end systems. In a typical pipeline system, an automatic speech recognition (ASR) module generates a transcription of utterances and an SLU module predicts semantic labels based on the transcript. However, an ASR module may depend on a large amount of training data, and generating the appropriate dataset is both time and resource intensive.

An alternative to the pipeline architecture is an end-to-end architecture, where semantic representations are produced directly from a speech input without using transcriptions. However, some end-to-end architectures are not appropriate for more complex SLU tasks such as semantic chunking and tagging task. Furthermore, like pipeline systems, existing end-to-end SLU networks are trained on a large amount of data. In some cases, end-to-end architectures also rely on external pre-trained language models, or transfer learning from other natural language processing (NLP) tasks such as named entity recognition (NER).

Therefore, the present disclosure provides a data efficient end-to-end SLU network. Embodiments of the present disclosure include an artificial neural network that is trained without an additional, pre-trained external module. Furthermore, the described systems and methods can perform complex SLU tasks such as end-to-end semantic chunking and tagging of spoken utterances. In some embodiments, the network includes an incremental training procedure where acoustic, language and semantic models are trained sequentially one after the other. Embodiments of the present disclosure have a reasonable size and achieve superior results while using a smaller training dataset.

Accordingly, embodiments of the present disclosure represent an improvement over conventional technology in the field of spoken language understanding. The improvement includes using a multi-stage encoder comprising a basic encoder and a sequential encoder, where the basic encoder generates character features and the sequential encoder generate token features. This multi-stage encoder provides an end-to-end architecture that can provide accurate interpretation of spoken language data using a smaller training set and without the aid of an external training module.

System Overview

Figure 1:
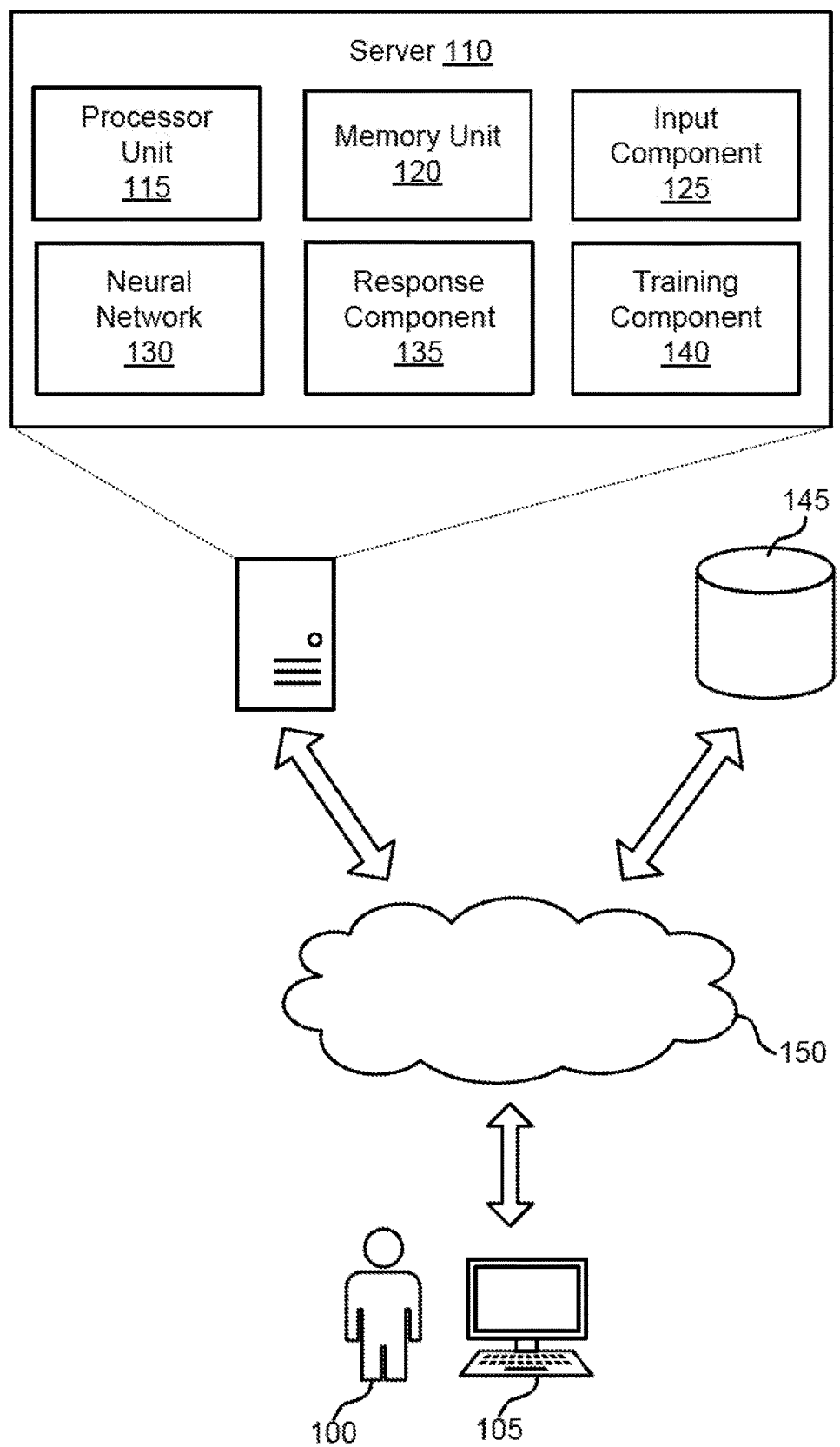
FIG. 1 shows an example of a system for spoken language understanding (SLU) according to aspects of the present disclosure.

FIG. 1 shows an example of a system for spoken language understanding (SLU) according to aspects of the present disclosure. The example shown includes user 100, user device 105, server 110, database 145, and cloud 150. In one embodiment, server 110 includes processor unit 115, memory unit 120, input component 125, neural network 130, response component 135, and training component 140. However, in other embodiments, the components and functions of the server are located on the user device 105.

According to one example, the user 100 provides a spoken expression such as a query or command into the user device 105. The user device 105 transmits the expression via the cloud 150 to the server 110, which processes the expression and produces semantic information about the expression. In some cases, an application (i.e., on the server 110 or the user device 105) performs an action or provides a response to the user 100 based on the semantic information.

According to one embodiment, user device 105 is a computing device such as a personal computer, laptop computer, mainframe computer, palmtop computer, personal assistant, mobile device, or any other suitable processing apparatus.

A cloud 150 is a computer network configured to provide on-demand availability of computer system resources, such as data storage and computing power. In some examples, the cloud provides resources without active management by the user. The term "cloud" is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

A server 110 provides one or more functions to users linked by way of one or more of the various networks. In some cases, a server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP). In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A database 145 stores data, such as data for training a neural network, in a structured format. A database may be structured as a single database, a distributed database, multiple distributed databases, or an emergency backup database. In some cases, a database controller may manage data storage and processing in a database. In some cases, a user 100 interacts with database controller. In other cases, database controller may operate automatically without user interaction.

A processor unit 115 is an intelligent hardware device (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, a processor is configured to operate a memory array using a memory controller. In other cases, a memory controller is integrated into the processor. In some cases, the processor is configured to execute computer-readable instructions stored in a memory to perform various functions. In some examples, a processor includes special purpose components for modem processing, baseband processing, digital signal processing, or transmission processing. In some examples, the processor comprises a system-on-a-chip.

A memory unit 120 stores information for various programs and applications on a computing device. For example, the storage includes data for running an operating system. In some cases, the memory includes both volatile memory and non-volatile memory. Volatile memory includes random access memory (RAM), and non-volatile memory includes read-only memory (ROM), flash memory, electrically erasable programmable read-only memory (EEPROM), digital tape, a hard disk drive (HDD), and a solid state drive (SSD). In some cases, memory includes any combination of readable and/or writable volatile memories and/or non-volatile memories, along with other possible storage devices.

Input component 125 receives input from the user 100 or the user device 105. For example, the input may include a spoken language query or command. In one embodiment, input component 125 receives audio data for a spoken language expression. For example, the spoken language expression can include an audio recording of a command or query for a software application. In some embodiments, input component 125 also generates a spectrogram based on the audio data. The input component 125 divides the spectrogram into a set of frames, and a multi-stage encoder takes the set of frames as input.

A spectrogram refers to a representation of the frequencies of an audio signal over time. According to an example, the spectrogram includes multiple vectors. Each vector has a length of 15 milliseconds (ms). For example, if an audio is 60-millisecond long, the pre-processed spectrogram includes 4 vectors.

A neural network 130 is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it can process the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

Some embodiments of the present disclosure include a neural network capable of performing end-to-end semantic chunking and tagging of spoken utterances. In some examples, the neural network 130 includes one or more feed-forward neural networks (FFNN).

In some examples, the neural network 130 is trained using an incremental training process including a first training phase for training the basic encoder, a second training phase for training the sequential encoder, and a third training phase for training the neural network 130 as a whole.

In some embodiments, the neural network 130 is trained incrementally for different SLU sub-tasks. The sub-tasks to be trained include identifying acoustic features, characters, tokens, and concepts decoded from speech. The system learns a basic model for decoding characters, which are used as starting point for learning a sequential model for characters. The sequential model for characters is then used as starting point for a basic 2-stage model decoding tokens, which in turn initializes parameters of a sequential 2-stage model. The sequential 2-stage model decodes tokens together with token sequences. In some cases, the sequential 2-stage model learns acoustic and linguistic features of tokens together. The sequential 2-stage model performs at the same time the role of acoustic and language models. According to an exemplary embodiment, a sequential model for decoding concepts (SLU) is learned by stacking a new decoder on top of a 2-stage model. In one embodiment, models are learned minimizing a connectionist temporal classification CTC loss.

In one embodiment, response component 135 generates a response to the spoken language expression based on the semantic information. For example, the response could be a spoken response, a text response, or an action taken in response to the spoken language expression.

In one embodiment, training component 140 trains a basic encoder to generate character features based on a spoken language expression. Character features refers to basic acoustic features that correspond to a single character or phoneme. Training component 140 also trains a sequential encoder to generate token features based on the spoken language expression. Token features refer to complex features (compared to character features) corresponding to a single word, or concept.

In some cases, training component 140 combines the basic encoder, the sequential encoder and a decoder in sequence to produce an end-to-end neural network 130 for spoken language understanding. Thus, training component 140 trains the end-to-end network to generate semantic information for the spoken language expression.

In some cases, training component 140 appends one or more linear layers with a log-softmax output function to the basic encoder during training, and predicts the character features for the spoken language expression using the one or more linear layer. In some cases, training component 140 also compares the predicted character features to ground-truth character features. Training component 140 then adjusts parameters of the basic encoder based on the comparison. In some cases, training component 140 also removes log-softmax output function prior to combining the basic encoder, the sequential encoder, and the decoder.

In some examples, training component 140 also appends a linear layer and a sequential decoder to layers of a basic model to form the sequential decoder. Training component 140 then predicts token features for the spoken language expression using the linear layer and the sequential decoder, and compares the predicted token features to ground-truth token features. Training component 140 then adjusts parameters of the layers of the basic model, the linear layer, and the sequential decoder based on the comparison.

Finally, training component 140 predicts semantic information for the spoken language expression using the end-to-end network, and compares the predicted semantic information to ground truth semantic information. Training component 140 then updates parameters of the basic encoder, the sequential encoder and the decoder based on the comparison. In some cases, training component 140 trains the end-to-end network based on a connectionist temporal classification (CTC) loss.

SLU training tasks may be split into acoustic and language model learning sub-tasks. Sub-tasks may be learned jointly in an end-to-end framework using a neural network. However, in some cases, it is efficient to learn incrementally the different sub-tasks involved in SLU (e.g., acoustic features, characters, tokens and finally concepts).

Accordingly, embodiments of the present disclosure provide a data efficient architecture which is trained end-to-end. In some examples, a network model is trained with no additional pre-trained external module. The network model includes a sequence-to-sequence neural model. The model achieves better results than traditional models while using a small training dataset (e.g., the French MEDIA dataset) and having a reasonable computational footprint. In one example, the system reaches 24.02% concept error rate (CER) on MEDIA test set while training on the MEDIA training set without any additional data.

In some cases, the neural network 130 does not use any externally pre-trained language model to rescore local predictions from the acoustic feature encoder. Rather, joint training is performed at different sub-task levels, resulting in learning semantic features jointly with acoustic and linguistic features. This can reduce the amount of training data or external information used for training the overall system.

During the training process, the weights of the neural network 130 are adjusted to improve the accuracy of the result (i.e., by minimizing a loss function which corresponds in some way to the difference between the predicted result and the target result). The weight of an edge increases or decreases the strength of the signal transmitted between nodes. In some cases, nodes have a threshold below which a signal is not transmitted at all. In some cases, the nodes are aggregated into layers. Different layers perform different transformations on their inputs. The initial layer is known as the input layer and the last layer is known as the output layer. In some cases, signals traverse certain layers multiple times.

FIG. 2 shows an example of a process for SLU according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 200, the user provides, and the system receives a spoken language expression. For example, the spoken language expression could be a command or query related to making a hotel reservation.

In one example, as illustrated in FIG. 1, input component 125 of a server 110 receives audio data for a spoken language expression. Input component 125 also generates a spectrogram based on the audio data. Input component 125 also divides the spectrogram into a set of frames, where the multi-stage encoder takes the set of frames as input.

According to an embodiment, the encoder takes as input the spectrogram of a speech signal, which is passed through a stack of convolutional and recurrent layers. According to an example, the spectrogram includes multiple vectors. Each vector has a length of 15 milliseconds (ms). For example, if an audio is 60-millisecond long, the pre-processed spectrogram includes 4 vectors.

At operation 205, the system encodes the spoken language expression. Embodiments of the present disclosure encode the audio data using a multi-stage encoder comprising a basic encoder and a sequential encoder. In some examples, the basic encoder is trained to generate character features during a first training phase and the sequential encoder is trained to generate token features during a second training phase. A decoder is trained to take the token features and generate semantic information representing the spoken language expression.

In one embodiment of the present disclosure, a network includes a sequence-to-sequence neural network model. Encoder of the network takes the spectrogram of a speech signal as input, which is passed through a stack of convolutional and recurrent layers, and generates representations of the output.

At operation 210, the system generates token features. According to an embodiment of the present disclosure, the encoder takes the spectrogram of a speech signal as input, which is passed through a stack of convolutional and recurrent layers, and generates representations of the output. The representations of the output include characters, tokens or semantic classes, depending on which sub-task is targeted.

At operation 215, the system decodes the token features to create semantic information. For example, the semantic information could include identifying a date, location, and number of guests for a hotel reservation.

According to an embodiment of the present disclosure, the decoder includes characteristics of both recurrent and transformer neural networks. The decoder takes the output of the encoder as input, as well as the decoder's own previous predictions. The combination of the output and previous predictions are integrated into the decoder as embeddings of discrete items (i.e., indexes). A hidden layer of the decoder embeds a concatenation of both acoustic and linguistic/semantic features. The network learns joint characteristics of both acoustic and language models, when characters or tokens are the items to be predicted. The network learns jointly acoustic and semantic features, when semantic tags are the items to be predicted. In some cases, the current prediction depends on previous predictions and allows the hidden layer to encode the sequential nature of output items.

At operation 220, the system responds to the spoken language expression based on the semantic information. In one example, the system makes a hotel reservation in response to the user command, and provides a confirmation to the user. In another example, the system transmits information relating to a user query (e.g., provide information about the weather based on a request from the user.).

Semantic Information

Figure 3:
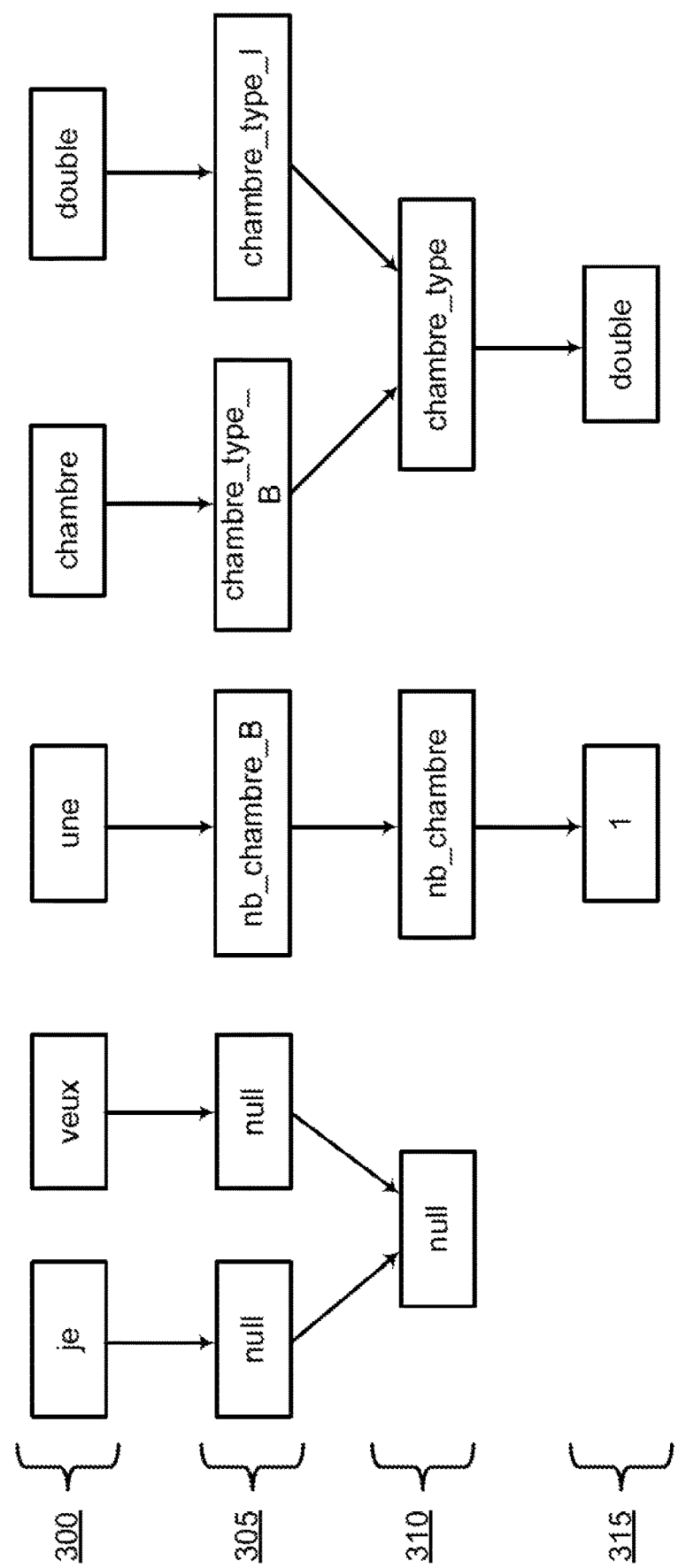
FIG. 3 shows an example of semantic information according to aspects of the present disclosure.

FIG. 3 shows an example of semantic information according to aspects of the present disclosure. The example shown includes words 300, tags 305, attribute names 310, and attribute values 315.

SLU tasks include semantic chunking and tagging of speech signals corresponding to user utterances in a conversation. For example, the subject matter of a spoken dialog system includes a domain of hotel information and reservation via an automatic system (e.g., French MEDIA corpus). For example, the French MEDIA corpus is made of 1250 human-machine dialogs acquired with a Wizard-of-OZ approach, where 250 users follow 5 different reservation scenarios. In some cases, spoken data is manually transcribed and annotated with domain concepts, following a rich ontology. In human-machine dialogs, a "turn" includes response from a machine or response/instruction from a user to the machine. In some cases, while turns are manually transcribed and can be used to train ASR models, only user turns are annotated with concepts (user sentences) and used to train SLU models.

In some cases, neural networks, instead of pipeline systems, are used to perform SLU. ASR tasks are trained on large amount of data and refined on a specific SLU task. ASR transcripts are used as input to the SLU module, which are then used to tag words with the concepts. A separate module is tasked with extracting normalized values from tokens instantiating a particular concept. In some cases, an extraction schema in the SLU task for spoken dialog systems includes concepts (i.e., attribute names) and values (i.e., attribute values). In one embodiment of the present disclosure, the system and network model include attribute names extraction, and directly decode whole concepts, without passing through the intermediate format.

According to an example, the SLU results are obtained with a model decoding both concepts and tokens. This enables tracking of which words instantiate a concept. For example, the words "chambre double" (double room in English) instantiate the concept chambre-type. The model generates the output <chambre double chamber-type>, which allows for attribute value extraction. The selected choice constrains the model to learn chunking and tagging at the same time, which is a more complex problem than just tagging. According to some embodiments, two alternatives include refining token representations during SLU model training, and decoupling chunking and tagging using a second decoder which decodes only concepts. The latter decoding strategy is referred to as an extended model. The extended model includes a first decoder and a second decoder. The first decoder generates a first output with concept boundary annotation while the second decoder generates concepts only, aligned to the output of the previous decoder. The extended model obtains results comparable to those obtained by models trained with much more training data.

Neural Network

Figure 4:
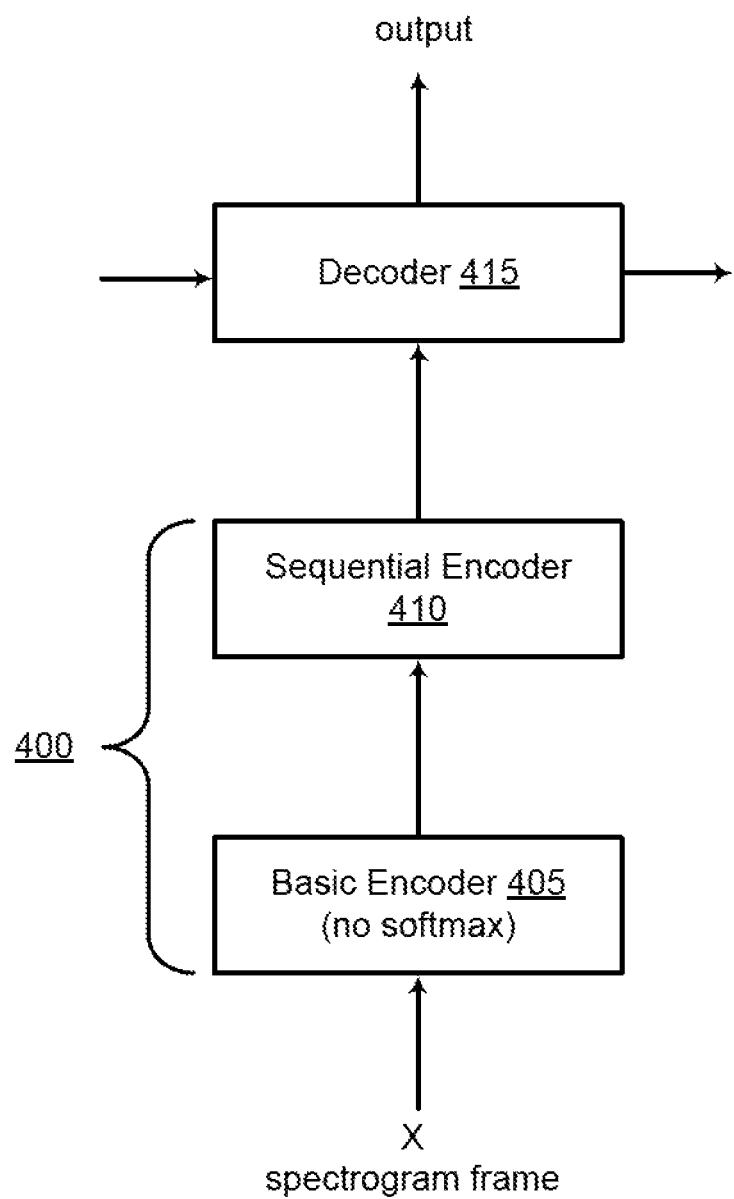
FIG. 4 shows an example of a neural network for SLU according to aspects of the present disclosure.

FIG. 4 shows an example of a neural network for SLU according to aspects of the present disclosure. The example shown includes multi-stage encoder 400 and decoder 415. In one embodiment, multi-stage encoder 400 encodes the audio data using a basic encoder 405 and a sequential encoder 410, where the basic encoder 405 is trained to generate character features during a first training phase and the sequential encoder 410 is trained to generate token features during a second training phase. In some examples, each of the encoder networks includes multiple layers such as convolutional neural network (CNN) layers and recurrent neural network (RNN) layers.

A CNN is a class of neural network that is commonly used in computer vision or image classification systems. In some cases, a CNN enables processing of digital images with minimal pre-processing. A CNN is characterized by the use of convolutional (or cross-correlational) hidden layers. These layers apply a convolution operation to the input before signaling the result to the next layer. Each convolutional node processes data for a limited field of input (i.e., the receptive field). During a forward pass of the CNN, filters at each layer are convolved across the input volume, computing the dot product between the filter and the input. During the training process, the filters are modified so that they activate when they detect a particular feature within the input.

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN includes finite impulse recurrent networks (characterized by nodes forming a directed acyclic graph), and infinite impulse recurrent networks (characterized by nodes forming a directed cyclic graph).

In one embodiment of the present disclosure, a neural network includes sequence-to-sequence neural models. According to an embodiment, the encoder (e.g., multi-stage encoder 400) takes the spectrogram of a speech signal as input, which is passed through a stack of convolutional and recurrent layers, and generates representations of the output. The representations of the output include characters, tokens or semantic classes, depending on which sub-task is targeted. In some examples, the encoder of the network has a similar architecture as the one used in a Deep Speech 2 architecture.

In one embodiment, multi-stage encoder 400 includes basic encoder 405 and sequential encoder 410. According to an embodiment, the multi-stage encoder 400 is trained to learn phones and tokens together. The multi-stage model can decode characters. That is, the model does not rely on a pronunciation dictionary. In an exemplary embodiment of the present disclosure, the multi-stage model is obtained by stacking a sequential model on top of a basic model. The final SLU model includes another decoder on top of the multi-stage encoder 400, and is trained to decode semantic concepts.

In one embodiment, basic encoder 405 generates a sequence of character feature vectors using the basic encoder 405, where each of the sequence of character feature vectors corresponds to one of the frames. In some examples, the character feature vectors are generated independently of each other.

In one embodiment, basic encoder 405 is configured to generate character features based on audio data for a spoken language expression, where the basic encoder 405 is trained in a first training phase. In some examples, the basic encoder 405 includes one or more CNN layers and one or more RNN layers. In some examples, the basic encoder 405 is trained using a linear layer with a log-softmax output function. Basic encoder 405 is an example of, or includes aspects of, the corresponding element described with reference to FIG. 6.

In an embodiment, the basic model (i.e., basic encoder 405) can predict an output item for each spectrogram frame independently, as a sequence of local decisions. In some cases, acoustic and linguistic-sequential features are learned incrementally. The encoder is used as a basic model. In order to be trained individually, a linear layer is added on top of it with a log-softmax output function.

In an embodiment, sequential encoder 410 generates a sequence of token feature vectors based on the sequence of character feature vectors. Sequential encoder 410 also generates a first token feature vector and then a second token feature vector based on the first token feature vector.

In an embodiment, sequential encoder 410 is configured to generate token features based on output of the basic encoder 405, wherein the sequential encoder 410 is trained during a second training phase. In some examples, the sequential encoder 410 includes one or more CNN layers, one or more RNN layers, a linear layer, and a sequential decoder 415. Sequential encoder 410 is an example of, or includes aspects of, the corresponding element described with reference to FIG. 7.

According to an embodiment of the present disclosure, in order to obtain the sequence-to-sequence model, the log-softmax output function is replaced with a decoder. The basic model (i.e., basic encoder 405) can predict an output item for each spectrogram frame independently, as a sequence of local decisions. In contrast, the sequential model (e.g., sequential encoder 410 plus the decoder) takes previous predicted items into account for the current prediction, and thus make contextual decisions.

According to an embodiment of the present disclosure, the basic and sequential models use one CNN layer with stride two and two Bi-directional long short-term memory (Bi-LSTM) layers. Layer normalization and dropout regularization (e.g., with p=0.5) are applied between each set of neighboring layers.

In an embodiment, decoder 415 decodes the token features to generate semantic information representing the spoken language expression. Decoder 415 also identifies a decoding position. Decoder 415 also computes a ratio between an output sequence of the multi-stage encoder 400 and a subsequent input sequence. Decoder 415 also computes a sum of encoder states based on the decoding position and the ratio, where the decoding is based on the sum of encoder states. In some examples, the semantic information includes contextual information. In some examples, the semantic information includes attribute names, attribute values, or both.

In an embodiment, decoder 415 is configured to generate semantic information for the spoken language expression based on an output of the sequential encoder 410, wherein the decoder 415 is trained together with the basic encoder 405 and the sequential encoder 410 during a third training phase.

In some examples, different learning tasks use different lengths between input sequence (e.g., speech spectrograms) and output sequences (characters, tokens or concepts). Let the input sequence have length N and the output sequence have length M. In general, N>>M. In one example, $$\frac{N}{M} \leq 30.$$

When the decoder is at processing step i, it has no information on which spectrogram frames to use as input. This problem can be solved using an attention mechanism to focus on the correct part of the input sequence depending on the part of the output sequence being decoded. According to an embodiment, based on a basic mechanism (since alignment is monotonic in SLU), the model can compute the ratio between output and input sequence lengths $$r = \frac{M}{N},$$

and when the model decodes at position i, it uses the sum of the encoder states around position $\lfloor i \cdot r \rfloor$.

In some examples, the size of layers in a model is based on optimization on development data. For example, the input spectrogram features are of dimension 81 and the dimension of convolutional layers is also 81, and recurrent layers (LSTMs) have a dimension of 256. In the decoder of the network, for example, embeddings of previous predictions have a dimension of 150 while hidden layers have a dimension of 300. Thus, according to some examples, the decoder used for predicting concepts may have twice the number of dimensions for each layer.

Embodiments of the present disclosure have fewer than 9.8 million parameters while some conventional networks have almost 100 million parameters. In some cases, models are learned coupled with an Adam optimizer, with learning rate of 0.0005 decayed linearly over 60 epochs. According to an embodiment, the training procedure starts with the incremental training strategy using predicted items. After a number of epochs (e.g., 5 epochs), the training switches to labeled items. At this point, each time the error rate is not improved on development data for two consecutive epochs, the training switches between known and predicted items learning.

Figure 5:
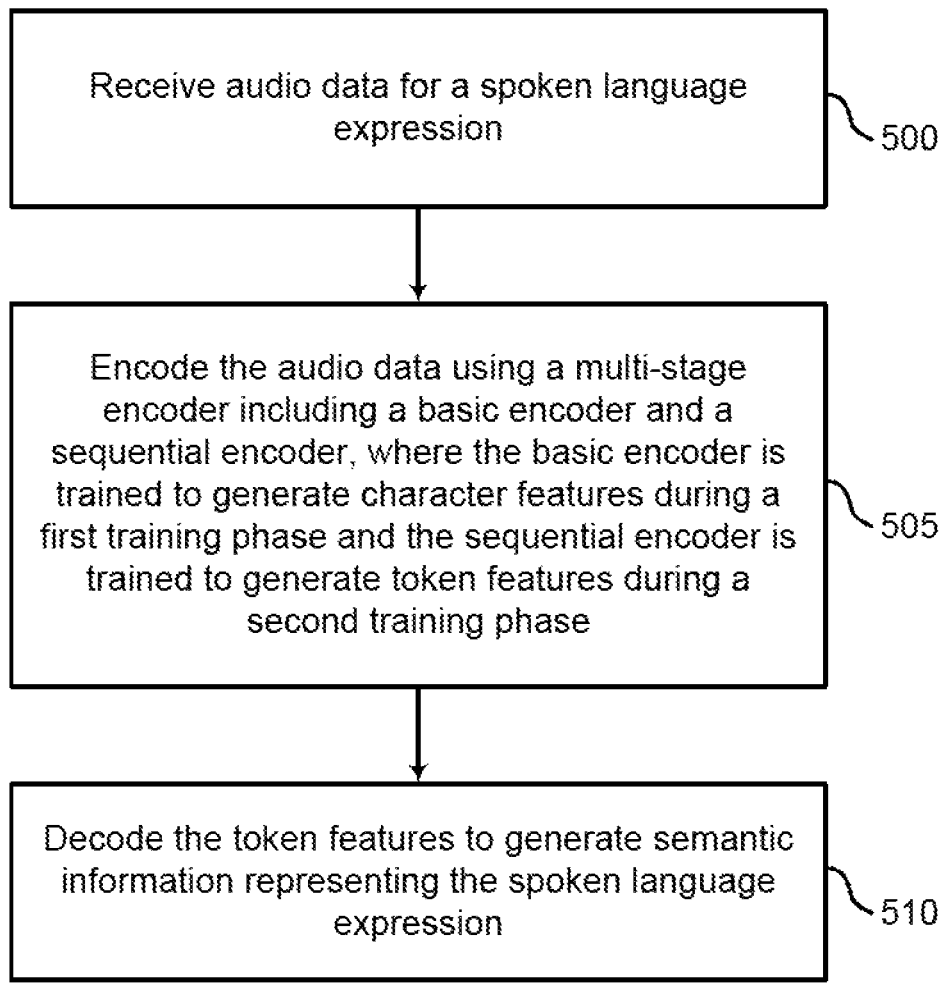
FIG. 5 shows an example of a process for SLU according to aspects of the present disclosure.

FIG. 5 shows an example of a process for SLU according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. In some cases, the operations are composed of various substeps, or are performed in conjunction with other operations described herein.

At operation 500, the system receives audio data for a spoken language expression. In some cases, the operations of this step refer to, or are performed by, an input component as described with reference to FIG. 1. According to an embodiment, an encoder of the network takes the spectrogram of a speech signal as input, which is passed through a stack of convolutional and recurrent layers, and generates representations of the output.

At operation 505, the system encodes the audio data using a multi-stage encoder including a basic encoder and a sequential encoder, where the basic encoder is trained to generate character features during a first training phase and the sequential encoder is trained to generate token features during a second training phase. In some cases, the operations of this step refer to, or are performed by, a multi-stage encoder as described with reference to FIG. 4.

In one embodiment, a network includes sequence-to-sequence neural models. According to an exemplary embodiment of the present disclosure, the network includes a multi-stage encoder 400 and a decoder 415, as illustrated in FIG. 4. The multi-stage encoder 400 further includes a basic encoder 405 and a sequential encoder 410. The network learns joint characteristics of both acoustic and language models, when characters or tokens are the items to be predicted. The network learns jointly acoustic and semantic features, when semantic tags are the items to be predicted. In some cases, the current prediction depends on previous predictions and allows the hidden layer to encode the sequential nature of output items.

According to some examples, the basic encoder 405 includes one or more CNN layers and one or more RNN layers. Basic encoder 405 is configured to generate character features based on audio data for a spoken language expression, wherein the basic encoder 405 is trained in a first training phase. In some examples, the basic encoder 405 is trained using a linear layer with a log-softmax output function.

In some examples, the sequential encoder 410 includes one or more CNN layers, one or more RNN layers, a linear layer, and a sequential decoder 415 (as illustrated in FIG. 4). Sequential encoder 410 is configured to generate token features based on output of the basic encoder 405, wherein the sequential encoder 410 is trained during a second training phase.

The final SLU model includes another decoder on top of a 2-stage model (i.e., basic model and sequential model), and is trained to decode semantic concepts.

In some examples, a neural network is trained incrementally (i.e., using an incremental training strategy). In some embodiments of the present disclosure, a network model uses neural architectures for training the sub-tasks involved in SLU incrementally (i.e., one after the other). The sub-tasks include acoustic features, characters, tokens and concepts decoding from speech. The system learns a basic model (i.e., basic encoder 405 of FIG. 4) for decoding characters, which is used as starting point for learning a sequential model for characters.

The sequential model (i.e., sequential encoder 410 plus the decoder) for characters is then used as starting point for a basic 2-stage model decoding tokens, which in turn initializes parameters of a sequential 2-stage model. The sequential 2-stage model decodes tokens together with token sequences. In some cases, the sequential 2-stage model learns acoustic and linguistic features of tokens together. The sequential 2-stage model performs at the same time the role of acoustic and language models. According to an embodiment, a sequential model for decoding concepts (SLU) is learned by stacking a new decoder on top of a basic 2-stage model. In one embodiment, sequential models are learned through minimizing a CTC loss.

In some cases, when learning the sequential model, previous items given as input to the decoder are a much stronger predictor of the current item compared to representations of spectrogram input. The network model signals much more importance to the previous items than to acoustic features, creating a mismatch between training and testing conditions, when previous items must be predicted. In order to avoid this, in some cases sequential models are trained starting with predicted items, when the learning rate is the greatest. After a given number of training epochs (i.e., a hyperparameter), when weights have been sufficiently shaped from acoustic features, the network switches to training with pre-labeled items. The rest of the training is led by the error rate on development data.

At operation 510, the system decodes the token features to generate semantic information representing the spoken language expression. In some cases, the operations of this step refer to, or are performed by, a decoder as described with reference to FIG. 4.

According to an embodiment of the present disclosure, the decoder includes characteristics of both recurrent and transformer neural networks. The decoder takes the output of the encoder as input, as well as the decoder's own previous predictions. The combination of the output and previous predictions are integrated into the decoder as embeddings of discrete items (i.e., indexes). A hidden layer of the decoder embeds a concatenation of both acoustic and linguistic/semantic features.

In some examples, learning tasks use different lengths between input sequence (e.g., speech spectrograms) and output sequences (characters, tokens or concepts). Let the input sequence have length N and the output sequence have length M. In general, N>>M. In one example, $$\frac{N}{M} \leq 30.$$

When the decoder is at processing step i, it has no information on which spectrogram frames to use as input. This problem can be solved using an attention mechanism to focus on the correct part of the input sequence depending on the part of the output sequence being decoded. According to an embodiment, based on a basic mechanism (since alignment is monotonic in SLU), the model can compute the ratio between output and input sequence lengths $$r = \frac{M}{N},$$

and when the model decodes at position i, it uses the sum of the encoder states around position $\lfloor i \cdot r \rfloor$.

Basic Encoder

Figure 6:
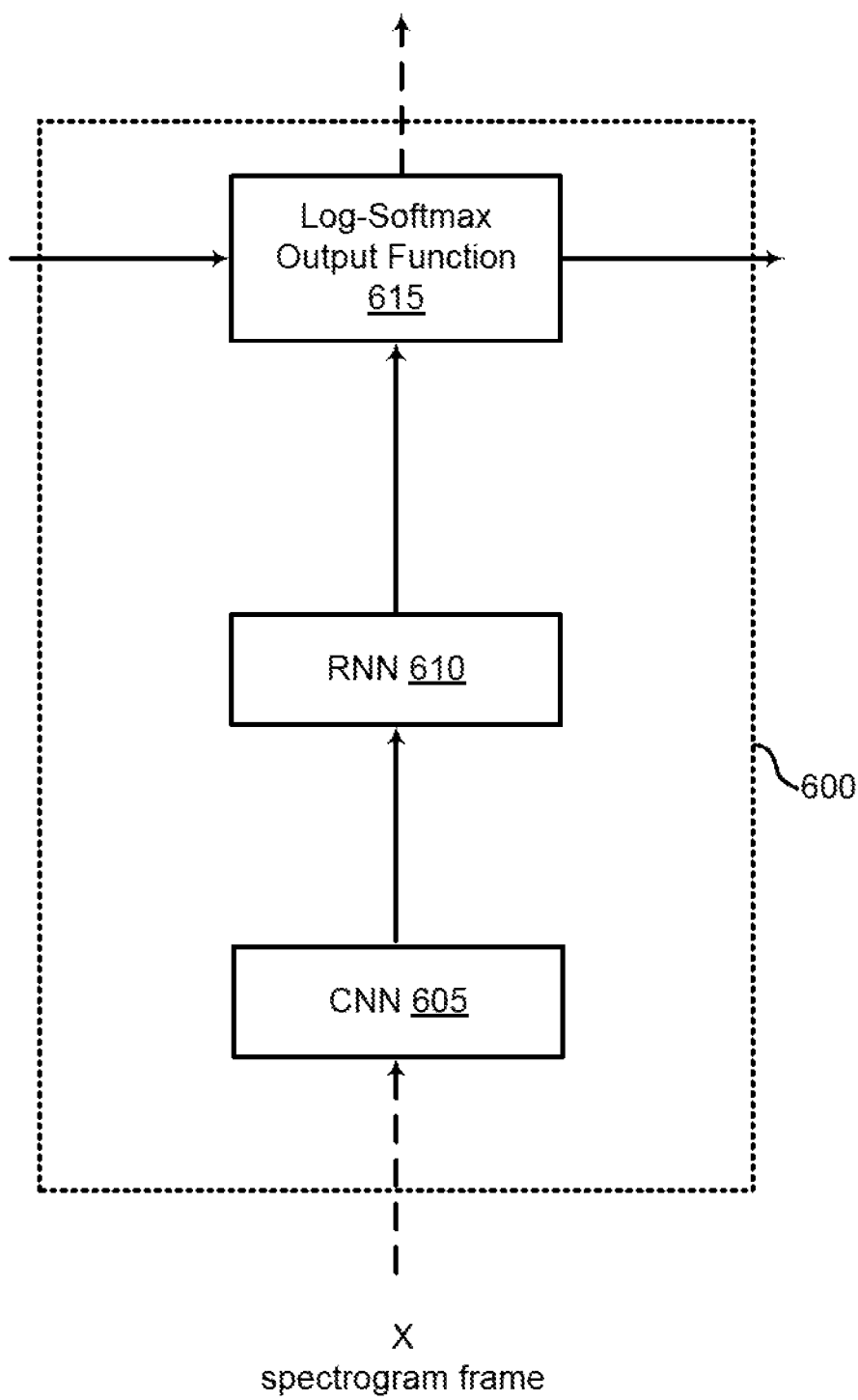
FIG. 6 shows an example of a basic encoder during training according to aspects of the present disclosure.

FIG. 6 shows an example of a basic encoder 600 during training according to aspects of the present disclosure. Basic encoder 600 is trained to identify acoustic features, and is an example of, or includes aspects of, the corresponding element described with reference to FIG. 4.

In one embodiment, basic encoder 600 includes CNN 605, RNN 610, and log-softmax output function 615 (at least during the training phase). CNN 605 is an example of, or includes aspects of, the corresponding element described with reference to FIG. 7. RNN 610 is an example of, or includes aspects of, the corresponding element described with reference to FIG. 7.

In one embodiment of the present disclosure, a network includes sequence-to-sequence neural models. According to an embodiment, the encoder takes the spectrogram of a speech signal as input, which is passed through a stack of convolutional and recurrent layers, and generates representations of the output.

According to an exemplary embodiment of the present disclosure, basic encoder 600 is configured to generate character features based on audio data for a spoken language expression, wherein the basic encoder 600 is trained in a first training phase. In some examples, the basic encoder 600 includes one or more CNN layers and one or more RNN layers. In some examples, the basic encoder 600 is trained using a linear layer with a log-softmax output function.

In some embodiments, sub-tasks involved in SLU are trained incrementally, one after the other. The sub-tasks include acoustic features, characters, tokens and concepts decoded from speech. A basic model is trained for decoding characters, which is used as starting point for learning a sequential model for characters. In one embodiment, models are learned by minimizing the CTC loss.

In some cases, the size of layers in a model is based on optimization on development data. For example, the input spectrogram features are of dimension 81 and the dimension of convolutional layers is also 81, and recurrent layers such as long-short term memory (LSTM) layers have 256 dimensions. According to an embodiment of the present disclosure, the basic model uses one CNN layer with stride two and two Bi-directional long short-term memory (Bi-LSTM) layers. Layer normalization and dropout regularization (e.g., with p=0.5) are applied between two neighboring layers or between sets of two layers.

Sequential Encoder

Figure 7:
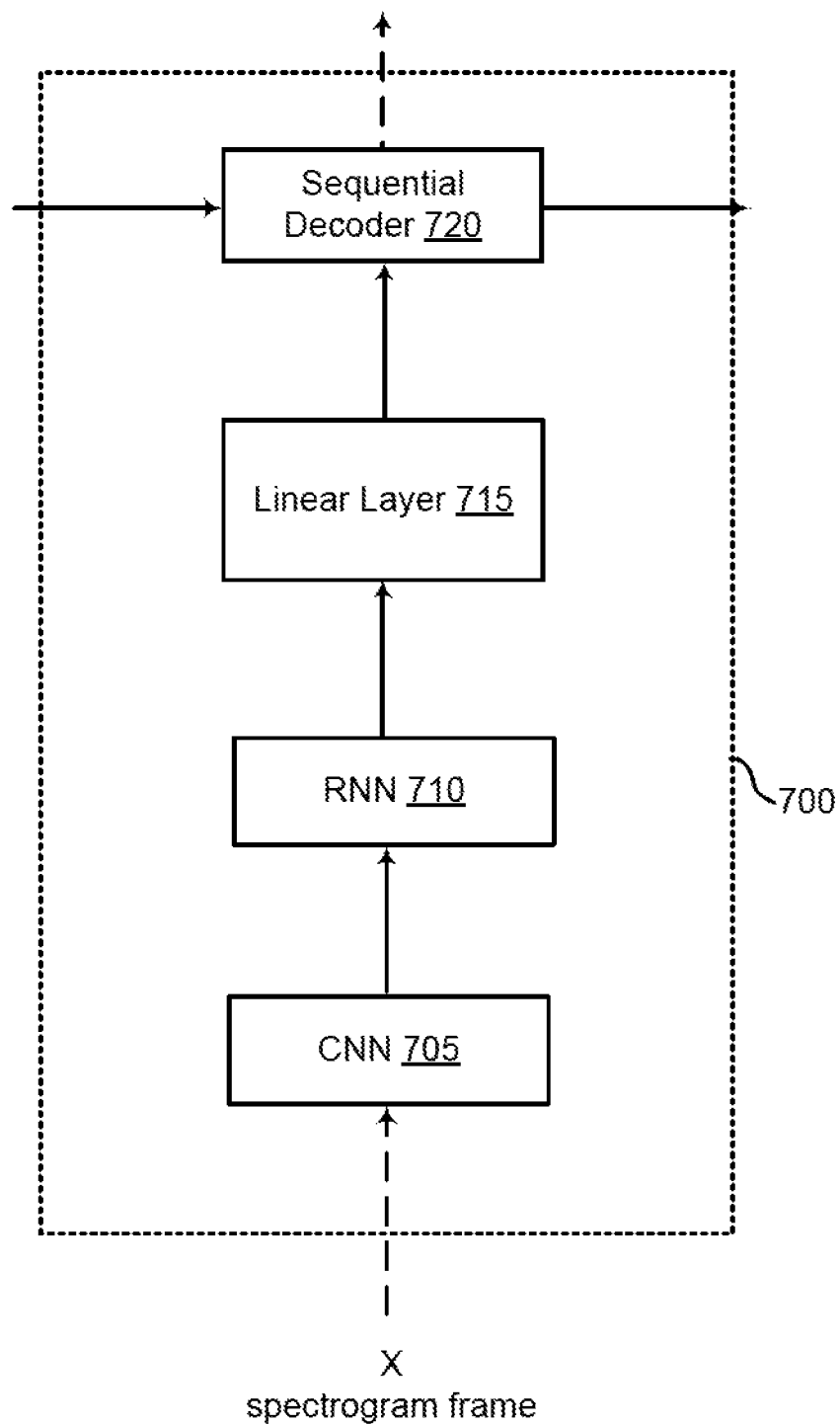
FIG. 7 shows an example of a sequential encoder during training according to aspects of the present disclosure.

FIG. 7 shows an example of a sequential encoder 700 during training according to aspects of the present disclosure. Sequential encoder 700 is trained to identify acoustic and language features, and is an example of, or includes aspects of, the corresponding element described with reference to FIG. 4.

In one embodiment, sequential encoder 700 includes CNN 705, RNN 710, linear layer 715, and sequential decoder 720. CNN 705 is an example of, or includes aspects of, the corresponding element described with reference to FIG. 6. RNN 710 is an example of, or includes aspects of, the corresponding element described with reference to FIG. 6.

In one embodiment, sequential encoder 700 is configured to generate token features based on output of the basic encoder (e.g., 405 or 600), wherein the sequential encoder 700 is trained during a second training phase. In some examples, the sequential encoder 700 includes one or more CNN layers, one or more RNN layers, a linear layer, and a sequential decoder.

In one embodiment, sequential encoder 700 generates a sequence of token feature vectors based on the sequence of character feature vectors using the sequential encoder 700. Sequential encoder 700 also generates a first token feature vector. Sequential encoder 700 also generates a second token feature vector based on the first token feature vector.

In some embodiments, the sub-tasks involved in SLU are trained incrementally, one after the other. The sub-tasks include identifying acoustic features, characters, tokens and encoding semantic concepts from speech. In one embodiment, the basic model is trained for decoding characters, which is used as starting point for learning a sequential model for characters. The sequential model for characters is then used as starting point for a basic 2-stage model decoding tokens, which in turn initializes parameters of a sequential 2-stage model. The sequential 2-stage model decodes tokens together with token sequences. In some cases, the sequential 2-stage model learns acoustic and linguistic features of tokens together. The sequential 2-stage model performs at the same time the role of acoustic and language models. According to an exemplary embodiment, a sequential model for decoding concepts (SLU) is learned by stacking a new decoder on top of a basic 2-stage model. In one embodiment, models are learned by minimizing the CTC loss.

In some examples, the size of layers in a model is based on optimization on development data. For example, the input spectrogram features are of dimension 81 and the dimension of convolutional layers is also 81, and recurrent layers (LSTMs) have 256 dimensions. According to an embodiment of the present disclosure, the sequential model uses only one CNN layer with stride two and two Bi-directional long short-term memory (Bi-LSTM) layers. Layer normalization and dropout regularization (e.g., with p=0.5) are applied between each set of two layers.

Training

Figure 8:
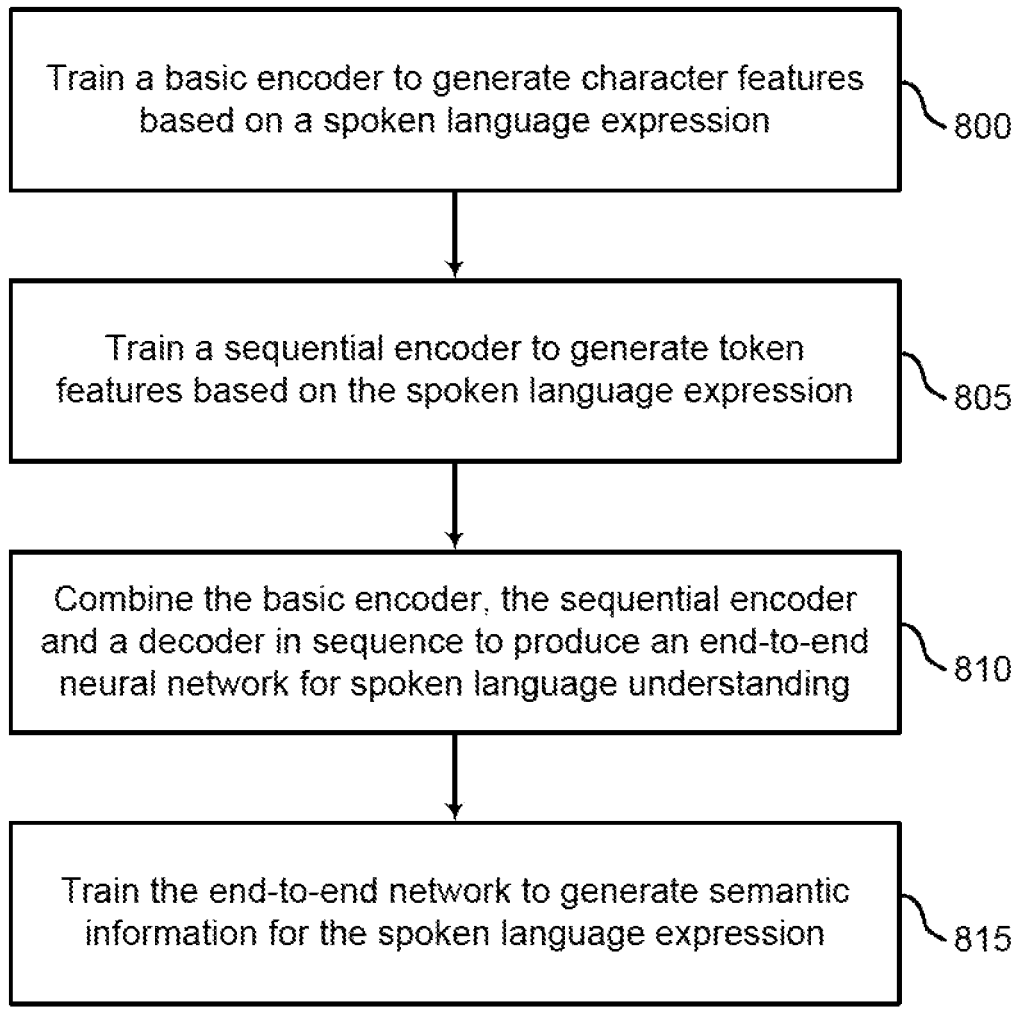
FIG. 8 shows an example of a process for training a neural network according to aspects of the present disclosure.

FIG. 8 shows an example of a process for training a neural network according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 800, the system trains a basic encoder to generate character features based on a spoken language expression. In some cases, the operations of this step refer to, or are performed by, a training component as described with reference to FIG. 1. In some cases, acoustic and linguistic-sequential features are learned incrementally. The basic model refers to the basic encoder (e.g., 405 or 600). In order for the basic encoder to be trained individually, a linear layer is added on top of it with a log-softmax output function.

At operation 805, the system trains a sequential encoder to generate token features based on the spoken language expression. In some cases, the operations of this step refer to, or are performed by, a training component as described with reference to FIG. 1.

According to an embodiment of the present disclosure, in order to obtain the sequence-to-sequence model, the log-softmax is replaced with a decoder. The basic model can predict an output item for each spectrogram frame independently, as a sequence of local decisions. In contrast, the sequential model (e.g., sequential encoder plus a decoder) takes previous predicted items into account for the current prediction, and thus enables contextual decisions.

At operation 810, the system combines the basic encoder, the sequential encoder and a decoder in sequence to produce an end-to-end neural network for spoken language understanding. In some cases, the operations of this step refer to, or are performed by, a training component as described with reference to FIG. 1.

In some examples, a 2-stage model is trained to learn phones and tokens together. According to an embodiment, the 2-stage model can decode characters. That is, the network does not rely on a pronunciation dictionary. The 2-stage model is obtained by stacking a sequential model on top of a basic model. The final SLU model includes another decoder on top of the 2-stage model, and is trained to decode semantic concepts.

At operation 815, the system trains the end-to-end network to generate semantic information for the spoken language expression. In some cases, the operations of this step refer to, or are performed by, a training component as described with reference to FIG. 1.

In some examples, a neural network is trained incrementally through incremental training strategy. In some embodiments of the present disclosure, a network model uses neural architectures for training the sub-tasks involved in SLU incrementally (i.e., one after the other). The sub-tasks of SLU include acoustic features, characters, tokens and concepts decoding from speech. The system learns a basic model (i.e., basic encoder 405 of FIG. 4) for decoding characters, which is used as starting point for learning a sequential model for characters. The sequential model (i.e., sequential encoder 410 plus the decoder) for characters is then used as starting point for a basic 2-stage model decoding tokens, which in turn initializes parameters of a sequential 2-stage model.

The sequential 2-stage model decodes tokens together with token sequences. In some cases, the sequential 2-stage model learns acoustic and linguistic features of tokens together. The sequential 2-stage model performs at the same time the role of acoustic and language models. According to an embodiment, a sequential model for decoding concepts (SLU) is learned by stacking a new decoder on top of a 2-stage model. In one embodiment, sequential models are learned through minimizing CTC loss.

In some cases, when learning the sequential model, previous items given as input to the decoder are a much stronger predictor of the current item compared to representations of spectrogram input. Thus, the network model signals much more importance to the previous items than to acoustic features, creating a mismatch between training and testing conditions, when previous items must be predicted. In order to avoid this, sequential models are trained starting with predicted items, when the learning rate is the greatest. After a given number of training epochs (i.e., a hyper-parameter), when weights have been sufficiently shaped from acoustic features, the network switches to training with pre-labeled items. The rest of the training is led by the error rate on development data.

Embodiments of the present disclosure have less than 9.8 million parameters while some conventional networks have approximately 97 million parameters. In some cases, models are learned coupled with an Adam optimizer, with learning rate of 0.0005 decayed linearly over 60 epochs. According to an embodiment, the training procedure starts with the incremental training strategy using predicted items. After a number of epochs (e.g., 5 epochs), the training switches to labeled items. At this point, each time the error rate is not improved on development data for two consecutive epochs, the training switches between known and predicted items learning.

According to an embodiment, the training procedure with a variant of the curriculum strategy is used. For example, speech turns are sorted based on their increasing length. Shorter turns, which have simpler sequential structures, are presented first to the model. After a given number of training epochs (i.e., a hyper-parameter), the network switches to training with whole-dialog turn sequences.

Evaluation

An example embodiment of the present disclosure is compared to pipeline models and existing end-to-end models. Both ASR (for the word error rate) and SLU (for the concept error rate) results have been evaluated on MEDIA corpus. Together with the character and the 2-stage models, performance from a model decoding directly tokens is shown. According to one example evaluation, the sequential model performs better than the basic model, which does not use information of the output's sequential structure. The 2-stage model outperforms the token model which demonstrates that using pre-trained character models provides an advantage over training directly for decoding tokens. Training incrementally the different stages of the model is the effective choice. Training a 2-stage model from scratch (i.e., no-incremental), the error rate is much higher (e.g., over 60%). In some cases, using curriculum learning (i.e., sort speech turns based on their increasing length) is slightly beneficial.

For example, 1% lower word error rate (WER) compared to a model trained without curriculum strategy. Results coming from the network are competitive with previous ASR performance on MEDIA. For example, ASR in previous methods has an error rate of 30.4 on development data, and the present disclosure improves the error rate by a large margin. An ASR baseline based on an HMM-DNN model trained with Kaldi3 has an error rate of 25.1 on development data. In some cases, the model is trained end-to-end without any external data nor language model. Thus, some conventional methods require up to 12 times more ASR training data to achieve comparable performance. In one example, the ASR part of the model is trained with 4 different corpora, for a total of roughly 300 hours of speech. In another example, one method uses 5 different corpora, accounting for 500 hours of speech. According to an example, the model is trained on MEDIA training data only, consisting of 41.5 hours of speech.

In some cases, results are obtained with models trained with much more data exploiting NER tasks with transfer learning. For example, 3 NER corpora are used for bootstrapping an end-to-end system. This is then fine-tuned on a first SLU corpus similar to MEDIA, and finally on MEDIA. In some examples of training the network, user turns are annotated with concepts and these account for 16.8 hours (less than half of the 41.5 hours of speech available), containing both machine and user turns. An example embodiment improves such baseline by a large margin, proving that learning jointly acoustic and linguistic-sequential features in an end-to-end framework is more effective than rescoring outputs with an independent language model. The network provides a data efficient training procedure. According to an embodiment, the network achieves better or equal performance to models trained with much more data. In some examples, a curriculum strategy is used to transfer learning among different corpora.

Embodiments of the present disclosure provide a data efficient end-to-end SLU system. The model learns jointly acoustic and linguistic-sequential features, allowing to train SLU models without an explicit language model module (pre-trained independently and/or on huge amount of data). The efficiency of the system comes primarily from an incremental training procedure. The model achieves competitive results while using a small training dataset and having a reasonable computational footprint.

Accordingly, the present disclosure includes at least the following embodiments.

A method for spoken language understanding is described. Embodiments of the method include receiving audio data for a spoken language expression, encoding the audio data using a multi-stage encoder comprising a basic encoder and a sequential encoder, wherein the basic encoder is trained to generate character features during a first training phase and the sequential encoder is trained to generate token features during a second training phase, and decoding the token features to generate semantic information representing the spoken language expression.

An apparatus for spoken language understanding is described. The apparatus includes a processor, memory in electronic communication with the processor, and instructions stored in the memory. The instructions are operable to cause the processor to receive audio data for a spoken language expression, encode the audio data using a multi-stage encoder comprising a basic encoder and a sequential encoder, wherein the basic encoder is trained to generate character features during a first training phase and the sequential encoder is trained to generate token features during a second training phase, and decode the token features to generate semantic information representing the spoken language expression.

A non-transitory computer readable medium storing code for spoken language understanding is described. In some examples, the code comprises instructions executable by a processor to: receive audio data for a spoken language expression, encode the audio data using a multi-stage encoder comprising a basic encoder and a sequential encoder, wherein the basic encoder is trained to generate character features during a first training phase and the sequential encoder is trained to generate token features during a second training phase, and decode the token features to generate semantic information representing the spoken language expression.

Some examples of the method, apparatus, and non-transitory computer readable medium described above further include generating a spectrogram based on the audio data. Some examples further include dividing the spectrogram into a plurality of frames, wherein the multi-stage encoder takes the frames as input. Some examples of the method, apparatus, and non-transitory computer readable medium described above further include generating a sequence of character feature vectors using the basic encoder, wherein each of the sequence of character feature vectors corresponds to one of the frames. Some examples further include generating a sequence of token feature vectors based on the sequence of character feature vectors using the sequential encoder.

In some examples, the character feature vectors are generated independently of each other. Some examples of the method, apparatus, and non-transitory computer readable medium described above further include generating a first token feature vector. Some examples further include generating a second token feature vector based at least in part on the first token feature vector.

Some examples of the method, apparatus, and non-transitory computer readable medium described above further include identifying a decoding position. Some examples further include computing a ratio between an output sequence of the multi-stage encoder and a subsequent input sequence. Some examples further include computing a sum of encoder states based on the decoding position and the ratio, wherein the decoding is based on the sum of encoder states.

Some examples of the method, apparatus, and non-transitory computer readable medium described above further include generating a response to the spoken language expression based on the semantic information. In some examples, the semantic information comprises contextual information. In some examples, the semantic information includes attribute names, attribute values, or both.

A method for training spoken language understanding is described. Embodiments of the method include training a basic encoder to generate character features based on a spoken language expression, training a sequential encoder to generate token features based on the spoken language expression, combining the basic encoder, the sequential encoder and a decoder in sequence to produce an end-to-end neural network for spoken language understanding, and training the end-to-end network to generate semantic information for the spoken language expression.

An apparatus for training spoken language understanding is described. The apparatus includes a processor, memory in electronic communication with the processor, and instructions stored in the memory. The instructions are operable to cause the processor to train a basic encoder to generate character features based on a spoken language expression, train a sequential encoder to generate token features based on the spoken language expression, combine the basic encoder, the sequential encoder and a decoder in sequence to produce an end-to-end neural network for spoken language understanding, and train the end-to-end network to generate semantic information for the spoken language expression.

A non-transitory computer readable medium storing code for training spoken language understanding is described. In some examples, the code comprises instructions executable by a processor to: train a basic encoder to generate character features based on a spoken language expression, train a sequential encoder to generate token features based on the spoken language expression, combine the basic encoder, the sequential encoder and a decoder in sequence to produce an end-to-end neural network for spoken language understanding, and train the end-to-end network to generate semantic information for the spoken language expression.

Some examples of the method, apparatus, and non-transitory computer readable medium described above further include appending one or more linear layers with a log-softmax output function to the basic encoder. Some examples further include predicting the character features for the spoken language expression using the one or more linear layer. Some examples further include comparing the predicted character features to ground-truth character features. Some examples further include adjusting parameters of the basic encoder based on the comparison.

Some examples of the method, apparatus, and non-transitory computer readable medium described above further include removing log-softmax output function prior to combining the basic encoder, the sequential encoder, and the decoder.

Some examples of the method, apparatus, and non-transitory computer readable medium described above further include appending a linear layer and a sequential decoder to layers of a basic model. Some examples further include predicting token features for the spoken language expression using the linear layer and the sequential decoder. Some examples further include comparing the predicted token features to ground-truth token features. Some examples further include adjusting parameters of the layers of the basic model, the linear layer, and the sequential decoder based on the comparison.

Some examples of the method, apparatus, and non-transitory computer readable medium described above further include predicting semantic information for the spoken language expression using the end-to-end network. Some examples further include comparing the predicted semantic information to ground truth semantic information. Some examples further include updating parameters of the basic encoder, the sequential encoder and the decoder based on the comparison.

Some examples of the method, apparatus, and non-transitory computer readable medium described above further include training the end-to-end network based on a connectionist temporal classification (CTC) loss.

An apparatus for spoken language understanding is described. Embodiments of the apparatus include a basic encoder configured to generate character features based on audio data for a spoken language expression, wherein the basic encoder is trained in a first training phase, a sequential encoder configured to generate token features based on output of the basic encoder, wherein the sequential encoder is trained during a second training phase, and a decoder configured to generate semantic information for the spoken language expression based on an output of the sequential encoder, wherein the decoder is trained together with the basic encoder and the sequential encoder during a third training phase.

A method of manufacturing an apparatus for spoken language understanding is described. The method includes providing a basic encoder configured to generate character features based on audio data for a spoken language expression, wherein the basic encoder is trained in a first training phase, providing a sequential encoder configured to generate token features based on output of the basic encoder, wherein the sequential encoder is trained during a second training phase, and providing a decoder configured to generate semantic information for the spoken language expression based on an output of the sequential encoder, wherein the decoder is trained together with the basic encoder and the sequential encoder during a third training phase.

In some examples, the basic encoder comprises one or more convolutional neural network (CNN) layers and one or more recurrent neural network (RNN) layers. In some examples, the basic encoder is trained using a linear layer with a log-softmax output function. In some examples, the sequential encoder comprises one or more CNN layers, one or more RNN layers, a linear layer, and a sequential decoder. In some examples, the neural network is trained using an incremental training process including the first training phase for training the basic encoder, the second training phase for training the sequential encoder, and the third training phase for training the neural network as a whole.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of spoken language understanding, the method comprising:
    receiving audio data for a spoken language expression;
    encoding the audio data using a basic encoder of a multi-stage encoder to obtain character features, wherein the basic encoder is trained to generate the character features during a first training phase by appending a softmax layer to the basic encoder and comparing an output of the softmax layer to ground-truth character training data, and wherein the softmax layer is removed prior to encoding the audio data;
    encoding the character features using a sequential encoder of the multi-stage encoder to obtain token features, wherein the sequential encoder is trained to generate the token features during a second training phase based on ground-truth token training data; and
    decoding the token features to generate semantic information representing the spoken language expression.

2. The method of claim 1, further comprising:
generating a spectrogram based on the audio data; and
dividing the spectrogram into a plurality of frames, wherein the multi-stage encoder takes the frames as input.

3. The method of claim 2, further comprising:
generating a sequence of character feature vectors using the basic encoder, wherein each of the sequence of character feature vectors corresponds to one of the frames; and
generating a sequence of token feature vectors based on the sequence of character feature vectors using the sequential encoder.

4. The method of claim 3, wherein:
the character feature vectors are generated independently of each other.

5. The method of claim 3, further comprising:
generating a first token feature vector; and
generating a second token feature vector based at least in part on the first token feature vector.

6. The method of claim 1, further comprising:
identifying a decoding position;
computing a ratio between an output sequence of the multi-stage encoder and a subsequent input sequence; and
computing a sum of encoder states based on the decoding position and the ratio, wherein the decoding is based on the sum of encoder states.

7. The method of claim 1, further comprising:
generating a response to the spoken language expression based on the semantic information.

8. The method of claim 1, wherein:
the semantic information comprises contextual information.

9. The method of claim 1, wherein:
the semantic information includes attribute names, attribute values, or both.

10. A method of training a neural network for spoken language understanding, the method comprising:
    training a basic encoder to generate character features based on a spoken language expression in a first phase by appending a softmax layer to the basic encoder and comparing an output of the softmax layer to ground-truth character training data;
    removing the softmax layer from the basic encoder;
    training a sequential encoder to generate token features based on the spoken language expression in a second phase based on ground-truth token training data;
    combining the basic encoder, the sequential encoder and a decoder in sequence to produce an end-to-end neural network for spoken language understanding; and
    training the end-to-end network to generate semantic information for the spoken language expression.

11. The method of claim 10, further comprising:
appending one or more linear layers with a log-softmax output function to the basic encoder;
predicting the character features for the spoken language expression using the one or more linear layers;
comparing the predicted character features to ground-truth character features; and
adjusting parameters of the basic encoder based on the comparison.

12. The method of claim 11, further comprising:
removing the log-softmax output function prior to combining the basic encoder, the sequential encoder, and the decoder.

13. The method of claim 10, further comprising:
appending a linear layer and a sequential decoder to layers of a basic model;
predicting token features for the spoken language expression using the linear layer and the sequential decoder;
comparing the predicted token features to ground-truth token features; and
adjusting parameters of the layers of the basic model, the linear layer, and the sequential decoder based on the comparison.

14. The method of claim 10, further comprising:
predicting semantic information for the spoken language expression using the end-to-end network;
comparing the predicted semantic information to ground-truth semantic information; and
updating parameters of the basic encoder, the sequential encoder and the decoder based on the comparison.

15. The method of claim 10, further comprising:
training the end-to-end network is based on a connectionist temporal classification (CTC) loss.

16. An apparatus for spoken language understanding, comprising:
a basic encoder configured to generate character features based on audio data for a spoken language expression, wherein the basic encoder is trained in a first training phase by appending a softmax layer to the basic encoder and comparing an output of the softmax layer to ground-truth character training data, and wherein the softmax layer is removed prior to generating character features;
a sequential encoder configured to generate token features based on an output of the basic encoder, wherein the sequential encoder is trained during a second training phase based on ground-truth token training data; and
a decoder configured to generate semantic information for the spoken language expression based on an output of the sequential encoder, wherein the decoder is trained together with the basic encoder and the sequential encoder during a third training phase.

17. The apparatus of claim 16, wherein:
the basic encoder comprises one or more convolutional neural network (CNN) layers and one or more recurrent neural network (RNN) layers.

18. The apparatus of claim 16, wherein:
the basic encoder is trained using a linear layer with a log-softmax output function.

19. The apparatus of claim 16, wherein:
the sequential encoder comprises one or more CNN layers, one or more RNN layers, a linear layer, and a sequential decoder.

20. The apparatus of claim 16, wherein:
the apparatus is trained using an incremental training process including the first training phase for training the basic encoder, the second training phase for training the sequential encoder, and the third training phase for training the neural network as a whole.

* * * * *